Nov. 25, 1969   J. H. BOEGER   3,480,087
FLUID OPERATED TOOL WITH PRESSURE INDICATOR
Filed Feb. 20, 1968   2 Sheets-Sheet 1

INVENTOR.
JAMES H. BOEGER
BY Joseph W. Holloway
ATTORNEY

Nov. 25, 1969   J. H. BOEGER   3,480,087
FLUID OPERATED TOOL WITH PRESSURE INDICATOR
Filed Feb. 20, 1968

United States Patent Office 3,480,087
Patented Nov. 25, 1969

3,480,087
FLUID OPERATED TOOL WITH PRESSURE INDICATOR
James H. Boeger, Spring Lake, Mich., assignor to Gardner-Denver Company, Quincy, Ill., a corporation of Delaware
Filed Feb. 20, 1968, Ser. No. 706,950
Int. Cl. B25d *17/00;* F01b *31/12, 25/26*
U.S. Cl. 173—20          2 Claims

ABSTRACT OF THE DISCLOSURE

The combination of a fluid operated tool including a handle and a housing for the tool operating mechanism, and a visual pressure indicator located on the tool proper and substantially within the normal tool profile. Such a location of the indicator makes possible convenient and expedient signalling when the pressure of the motive fluid to the tool has reached a predetermined minimum value.

Background of the invention

Many types of fluid operated hand tools, such as tools for tightening threaded fasteners, are dependent on the supply pressure of the motive fluid, e.g. compressed air, to assure adequate torque in tightening the fastener or performing the intended tool function. These tools also frequently use pressure fluid-operated safety devices such as overtorque kick-out clutches which depend on adequate fluid pressure to release at a prescribed torque value and protect the tool operator from adverse reaction forces. Therefore it is important that a signal, readily observable by the tool operator, be displayed if supply pressure is below a predetermined minimum value necessary to assure adequate and safe tool performance.

In typical applications of pneumatic tools, the complexity of the pressure fluid distribution system involving numerous supply hoses, pressure regulators, and filters increases the probability of the supply pressure at any given tool connected to the system being inadequate as a result of frictional and leakage losses or faulty components in the system.

Heretofore it has been common practice to locate pressure gauges at various points in air distribution systems but in most cases they are too remote from the tools themselves to account for losses that may occur between the tool and the suitable gauge location, and all too often they are out of viewing range of individual tool operators. Moreover, gauges are too complex and cumbersome to locate directly on smaller hand-held power tools, and require too much operator viewing time to accurately establish the readout value since gauges usually comprise a needle indicating some value on a graduated scale.

It is important to sense the fluid pressure within the tool itself at a point between the connection of the fluid supply line to the tool and the tool throttling valve due to the fact that static pressure fluctuations downstream of the throttling valve and close to the tool operating mechanism frequently occur during the tool operating cycle. For example, in a rotary motor driven nutsetter, during the relatively free running portion of the nut tightening cycle, motor turning effort is minimized and motor speed provides for increased flow of the operating fluid and concomitant reduction in static pressure of the supply fluid downstream of the throttling valve. Therefore, it is desirable to locate the pressure indicator sensing point in the aforementioned area to avoid erroneous and misleading signals, but yet to indicate whether or not tool motive fluid supply pressure is adequate.

Since hand-held fluid power tools are customarily designed to be durable and to embody optimum handling characteristics it is required that any accessory elements attached to the tool be confined substantially within the normal tool envelope and also be simple and reliable in construction and operation.

Summary of the invention

The provision in a pressure fluid operated tool of a visual pressure indicator mounted directly on the tool makes possible a location for a signalling device that is well within the visual limits of the tool operator and also signals the pressure condition of the tool proper.

The invention also provides a tool together with a durable and simple indicator mounted substantially within the normal tool envelope or profile thereby not impairing the tool handling characteristics.

The invention also provides for a tool equipped with a signalling device which is easily monitored by the tool operator and displays a signal only when a condition less than a minimum limiting pressure exists, thereby not requiring to be read for any length of time such as would be required of a conventional pressure gauge. By relying on the visual sensing mode a warning of imminent malfunctioning of the tool can be made by the most inerrable alerting technique available, in view of the fact that in most tool operating environments operator auditory senses are overburdened.

Moreover, the invention provides for indicating the occurrence of a minimum pressure limit at a critical point in the tool which is at the tool proper but upstream of the tool throttling valve.

Description of the preferred embodiments

Figures 1, 2:
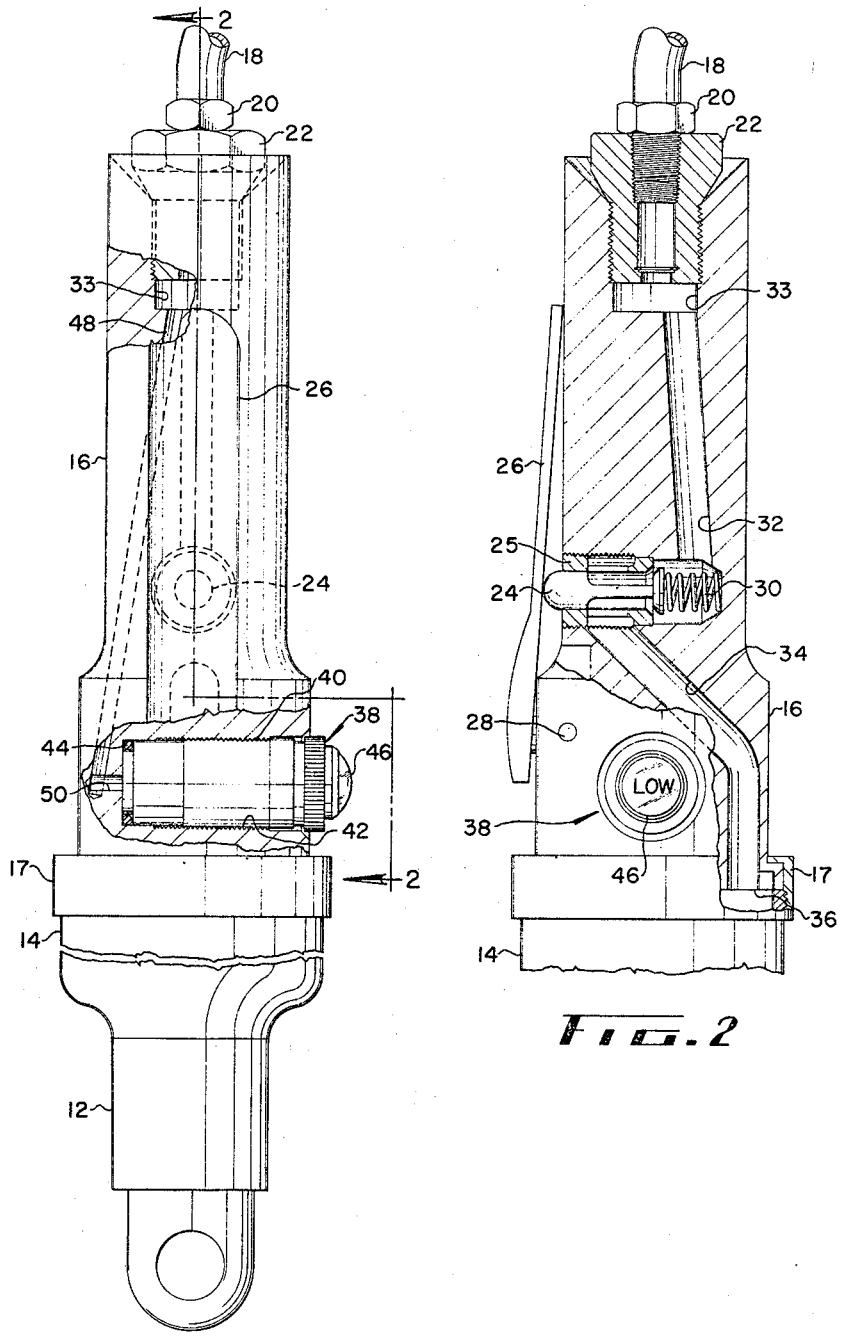
FIG. 1 is a view partly in section of a typical hand-held pneumatic power tool showing the location of the visual indicator.
FIG. 2 is a partial section taken along the line 2—2 of FIG. 1.

Referring to FIG. 1 and FIG. 2, a typical fluid operated tool of the straight handle type is shown having a drive attachment 12. In the illustrative example the tool casing includes a detachable housing 14 for the tool operating mechanism such as a rotary vane motor (not shown) and a handle 16. The housing 14 and handle 16 are secured by a nut 17 to form the complete casing. Pressure fluid such as compressed air may be supplied to the tool proper through the supply hose 18 which has a connector 20 threaded into a combination strainer and reducing bushing 22 which in turn is disposed in a partially threaded bore 33 in the handle 16.

Referring particularly to FIG. 2, a control or throttle valve 24 is slidably disposed in a hollow bushing 25 which in turn is threadably secured in the handle 16. The control valve 24 is operable by a hand lever 26 pivotally secured at 28. Depressing the lever 26 will unseat the valve 24 which is biased to a normally closed position by a coil spring 30. The valve 24 is interposed between a conduit 32 upstream of the valve and a conduit 34 downstream, the latter which leads directly to the tool operating mechanism such as a motor inlet port 36.

Also disposed in the handle 16 of the tool casing is a visual indicator assembly 38 which, as shown in FIG. 1, has an externally threaded housing 40 for securing the indicator assembly 38 within the threaded cavity 42. An O-ring seal 44 prevents leakage of pressure fluid out of the cavity 42.

The construction and operation of the indicator assembly 38 is well known to those skilled in the art, and various embodiments are commercially available. Basically, the indicator comprises a movable element within the housing 40 such as a spring biased piston which in response to a predetermined air pressure acting thereon will compress the spring and move so that a surface of the element comes into view through a lens 46. The surface may be of an appropriate color, or may have suitable indicia thereon, to apprise the tool operator that the predetermined pressure condition exists. As shown in FIG. 1, passages 48 and 50 communicate the bore 33 with the indicator cavity 42 to allow pressure fluid to flow to the indicator 38 thereby making the indicator responsive to the pressure condition at the inlet of the tool.

It will be apparent to those skilled in the art that the passages 48 and 50 could be located to communicate with other points in the pressure fluid conduit system within the tool proper, for example, at the motor inlet port 36 or other critical points within the tool where adequate fluid pressure is of importance to the performance capability of the tool. However, the location of the pressure sensing passage of the embodiment shown in FIG. 1 and FIG. 2 has proved to be more suitable as the static pressure of the fluid upstream of the control valve 24 is, during tool operation, less susceptible to the pressure surges near the motor inlet port. Misleading signals from the indicator are therefore avoided.

Figure 3:
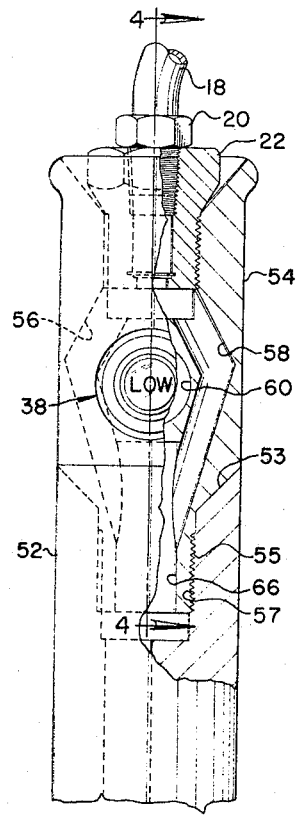
FIG. 3 is a view partly in section of a detachable handle portion of a typical pneumatic power tool embodying a visual indicator.
Figure 4:
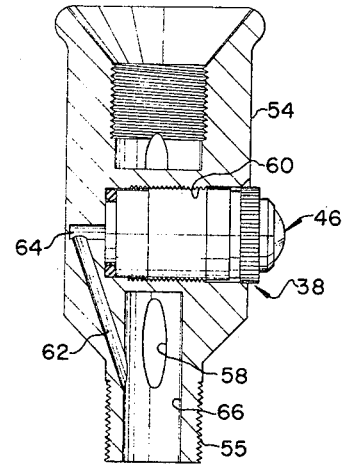
FIG. 4 is a sectional view of the detachable handle portion shown in FIG. 3 and is taken along the line 4—4 of FIG. 3.

An alternate embodiment of the invention is illustrated in FIG. 3 and FIG. 4. As shown in FIG. 3, a tool handle 52 similar to the handle 16 of FIG. 1 utilizes the countersunk portion 53 for accommodating a casing attachment 54 which has a reduced diameter portion 55 threaded for engagement with a threaded bore 57 in the handle 52. For appearance and optimum handling characteristics the attachment 54 is proportioned to conform closely to the shape of the main handle 52.

The attachment 54 being interposed between the main handle 52 and the pressure fluid supply hose 18 has passages 56 and 58 for conducting the main flow of pressure fluid therethrough. As shown in FIG. 4, the visual indicator 38 is similarly housed in a cavity 60. Passages 62 and 64 provide communication of the visual indicator 38 with the bore 66 which conducts the main flow received from the passages 56 and 58 to the tool main handle 52 housing the control valve and forming a part of the tool casing as in the embodiment of FIG. 1 and FIG. 2.

By providing an attachment to house the visual indicator which conforms to the tool handle without adding undue weight or bulk to the tool, the tool handle can be fabricated without consideration for including an indicator cavity thereby making the indicator an optional part of the tool proper.

The attachment 54 can also be readily removed from the tool for servicing the indicator without taking the tool out of service since the supply air hose 18 together with the bushing 22 can be connected directly to the main handle as the embodiment of FIG. 1 and FIG. 2 illustrates.

Moreover, the invention need not be limited to the conventional straight handle tool casing as illustrated in FIG. 1 through FIG. 4 but could be equally well applied to tools having pistol grip type casings or what are commonly known as in-line or short head type tools. The embodiment of FIG. 5 illustrates a tool of the latter type with an attachment housing a visual indicator connector to the tool and interposed between the fluid supply hose and the tool connection means.

Figure 5:
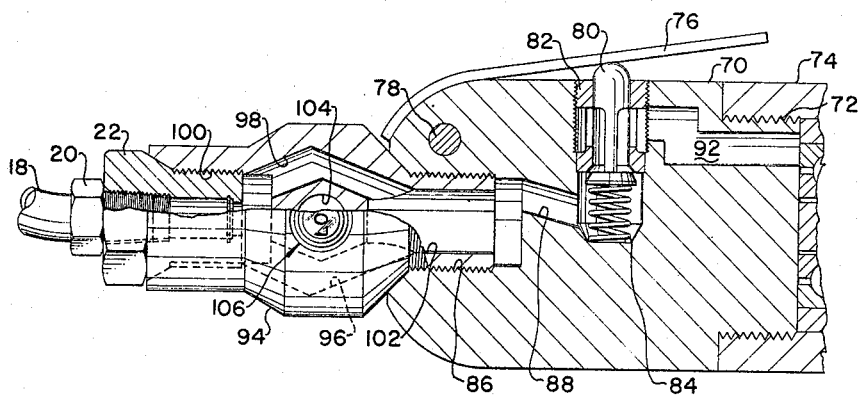
FIG. 5 is a longitudinal sectional view of another embodiment of an attachment housing, a visual indicator and shown connected to another fluid operated tool.

Referring to FIG. 5, a conventional in-line or short head type tool is shown in part having a casing head 70 with a threaded reduced diameter portion 72 secured to a motor housing 74. Motive fluid to the tool motor (not shown) is controlled by a hand operated lever 76 pivotally secured at 78 which engages a valve 80 slidably housed in a hollow bushing 82 and biased in the valve closed position by a coil spring 84. The valve 80 is shown in a partially open position whereby motive fluid admitted in the threaded bore 86 may flow through the short conduit 88 past the valve and through the hollow bushing and on through the conduit 92 to the tool motor.

Threadedly attached to the tool casing head 70 is a compact attachment 94 serving as an indicator housing and having passages 96 and 98 in communication with the bore 100. The bore 100 in turn receives the tool intake bushing 22 and motive fluid supply hose 18 attached thereto. Motive fluid from the supply hose may flow through the attachment 94 via the bore 100, the passages 96 and 98 and the bore 102 to the tool proper. The motive fluid is also communicated to a cavity 104 via passages, not shown, but similar in configuration to the embodiment of FIG. 4 whereby the static pressure of the fluid being supplied to the tool proper will be sensed by a visual pressure indicator 106 of like construction to the indicator 38 of FIG. 1 through FIG. 4.

It will be noted that the shape and proportions of the casing attachment 94 are not required to be such that the housing conforms to the tool geometry of the embodiment of FIG. 5 since the tool handling characteristics are such that no useful function would be served. Moreover, the styling of the attachment 94 would enable it to be used equally well with a variety of tool designs without adding undue weight and bulk to the tool or impairing tool operating efficiency.

What is claimed is:
1. A fluid operated tool comprising:
   a casing;
   a pressure fluid motor housed by said casing;
   pressure fluid conduit means defined by said casing and communicating with said motor;
   pressure fluid connection means on said casing in communication with said conduit means for connecting a supply of pressure fluid to said tool;
   a control valve interposed in said conduit means between said connection means and said motor for controlling said supply of pressure fluid to energize and deenergize said motor; and
   the improvement comprising: indicating means disposed on said tool casing and in direct communication with said conduit means between said connection means and said control valve for signalling when a pressure condition less than a minimum limiting pressure of said fluid supply exists.

2. The invention set forth in claim 1 wherein:
   said tool casing includes handle means having said pressure fluid connection means disposed thereon;
   said indicator means comprises a casing attachment having a fluid conduit therethrough, said casing attachment comprising a portion of said handle means and having complementary connection means in communication with said conduit and adapted for interpositioning said attachment between said casing and said pressure fluid supply; and,
   said attachment houses a visual indicator device substantially within the profile of said handle portion and in communication with said pressure fluid conduit through said attachment for signalling when a pressure condition less than a minimum limiting pressure of said fluid supply exists.

(References on following page)

References Cited

UNITED STATES PATENTS

| | | | |
|---|---|---|---|
| 1,475,252 | 11/1923 | Swanjord | 73—419 X |
| 1,732,249 | 10/1929 | Vashon | 73—389 X |
| 2,476,486 | 7/1949 | Ferguson | 173—20 X |
| 2,725,918 | 12/1955 | Deshler | 173—20 X |

ERNEST R. PURSER, Primary Examiner

U.S. Cl. X.R.

81—52.5; 91—1